July 24, 1962     O. L. MARS     3,045,349
MEANS FOR TAKING DENTAL IMPRESSIONS
Filed Nov. 20, 1958     4 Sheets-Sheet 1

INVENTOR
ORESTE LOUIS MARS

July 24, 1962    O. L. MARS    3,045,349
MEANS FOR TAKING DENTAL IMPRESSIONS
Filed Nov. 20, 1958    4 Sheets-Sheet 2

INVENTOR

ORESTE LOUIS MARS

July 24, 1962 O. L. MARS 3,045,349
MEANS FOR TAKING DENTAL IMPRESSIONS
Filed Nov. 20, 1958 4 Sheets-Sheet 3

INVENTOR
ORESTE LOUIS MARS

July 24, 1962 O. L. MARS 3,045,349
MEANS FOR TAKING DENTAL IMPRESSIONS
Filed Nov. 20, 1958 4 Sheets-Sheet 4

INVENTOR
ORESTE LOUIS MARS

United States Patent Office 3,045,349
Patented July 24, 1962

3,045,349
MEANS FOR TAKING DENTAL IMPRESSIONS
Oreste Louis Mars, 1 Rue Marceau, Cannes, France
Filed Nov. 20, 1958, Ser. No. 775,323
5 Claims. (Cl. 32—19)

The main preoccupations of any conscientious dental surgeon are to give his patient proper care, adequate treatment and finally a perfect denture, giving full satisfaction both from the esthetic and functional point of view.

But if it is true that the cares and treatments applied depend mostly on the practitioner's knowledge and skill, on the other hand, it is certain that most of his failures are due to insufficient modern apparatus put at his disposal. It is a fact that models constructed from dental impressions obtained by the usual methods, are not perfect reproductions of jaws at work.

The fact is that, usually, jaws are dealt with separately, while at rest, the mouth being open.

Failings in perfect denture fittings are invariably due to this working method, because models realized thus are static models. The articulation impression is fixed in wax during another sitting.

To remedy to this state of things, I have conceived a new method and produced the necessary apparatus for its practical application.

With this method it is possible to take simultaneously, while the mouth is closed and the jaw muscles contracted, impressions of the lower jaw, the upper jaw and the articulation. Moreover it is possible, to construct models with these impressions, set them together and articulate them without having to shape them. Such impressions will give functional models and the real dentures designed from these models, will, without fail, give full satisfaction.

Three different instruments are necessary: The impression tray, the mould for models, and the perfectly correct occlusion system.

An embodiment in accordance with the invention is shown in the accompanying drawings, wherein.

The impression carrier is made of three parts:

The screen clamp
The handle
The screen itself, for separating the lower from the upper impression plaster.

Figure 1:
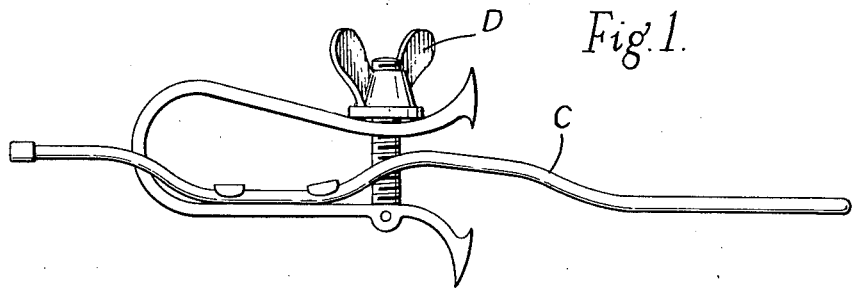
FIGURES 1 and 3 are respectively a side elevation and a perspective view of the clamping handle.
Figure 3:
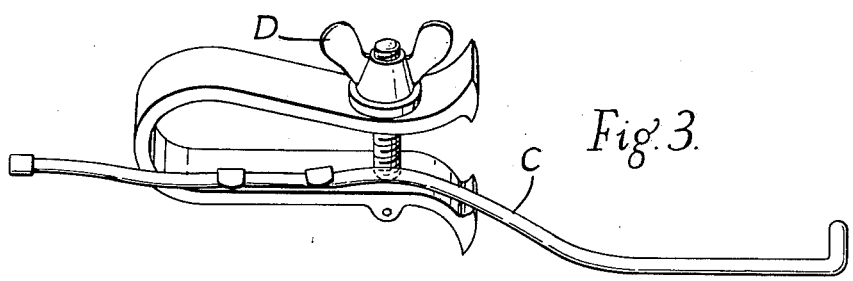
Figure 2:
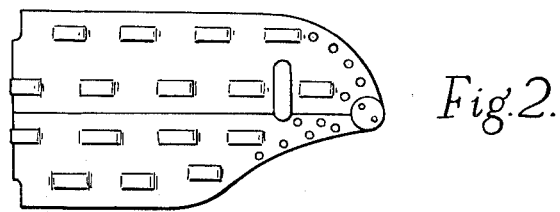
FIGURES 2 and 4 are respectively a side elevation and a perspective view of the screen clamp.
Figure 4:
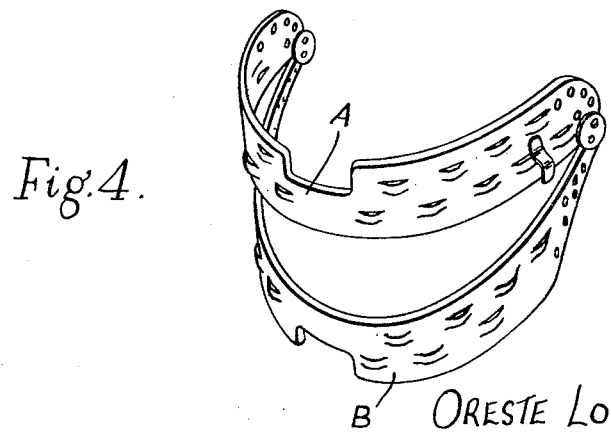

The screen clamp is made of two arcuate plates A and B reproducing the jaw arches, hinged together—FIGS. 2 and 4—the surface of which has teeth and indentations retaining the impression plaster, making it adhere perfectly. Between these two arcuate plates can be inserted the separation plate E. After the two parts of the screen clamp are brought together, they can be maintained in position by applying the clamping handle— FIGS. 1 and 3—secured tightly into place by the wing nut D, FIG. 1.

The clamping means is formed by a metal handle the ends of which can be brought together by tightening the wing nut D and which is used to keep the separating plate in position between the two parts of the screen clamp. The handle holds a removable capillary tube bringing compressed air.

Figure 5:
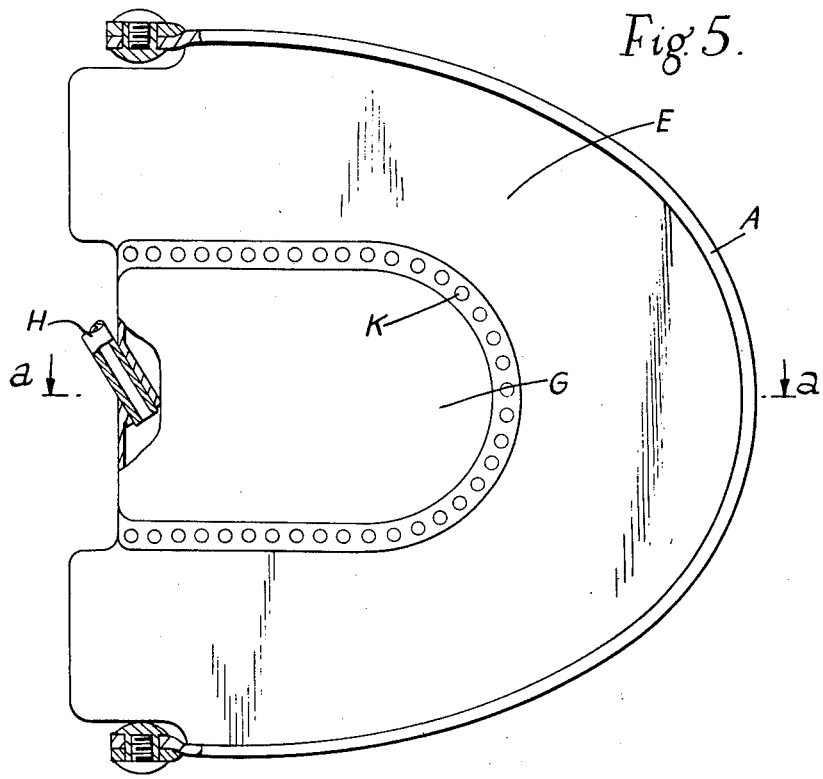
FIGURE 5 is a plan view of the separating screen.

The separation plate is a pewter sheet E, FIG. 5, which can be set between the parts of the screen clamp. Once held into position, the two sides of this sheet are named: the upper side "the palate side," and the lower side "the tongue side."

Figure 6:
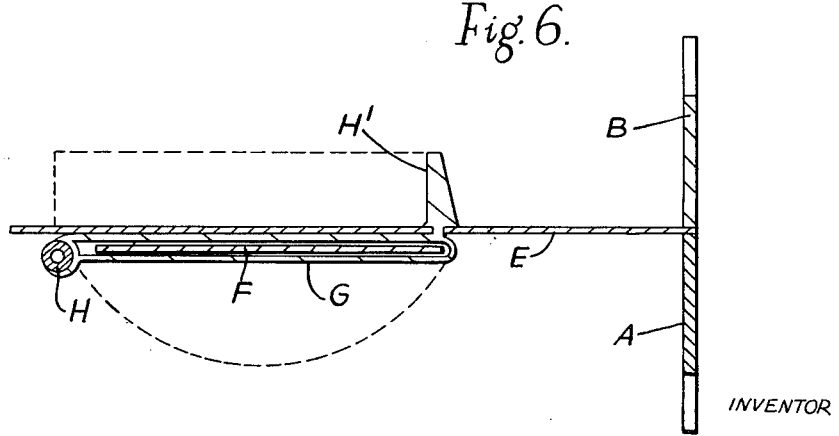
FIGURE 6 is a sectional view of the separating screen along the section line a—a in FIGURE 5.
Figure 7:
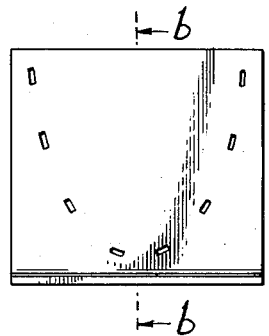
FIGURE 7 is a plan view of one side-piece of the model matrix.
Figure 8:
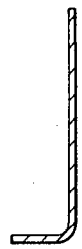
FIGURE 8 is a sectional view along the section line b—b in FIGURE 7.
Figure 9:
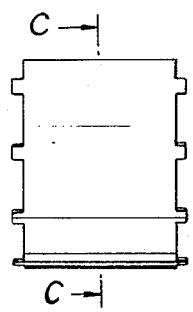
FIGURE 9 is an end view of the curved plate.
Figure 10:
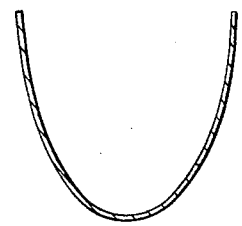
FIGURE 10 is a sectional view along section line c—c in FIGURE 9.

The "palate side" bears, stretched in its centre, an expansible bag G—FIG. 5—which takes the shape G'— FIG. 6—when compressed air is blown in through tube H—FIG. 5—connected with the capillary tube C—FIGS. 1 and 3. The above mentioned bag is held in shape by the metallic plate F—FIG. 6—placed between this bag and the pewter sheet. The lower part has a rubber flange H—FIG. 6—which is secured to the assembly by the rubber which filtered between the holes K—FIG. 5—during manufacture. The flange H retains the impression plaster against the interior of the lower jaw.

Figure 11:
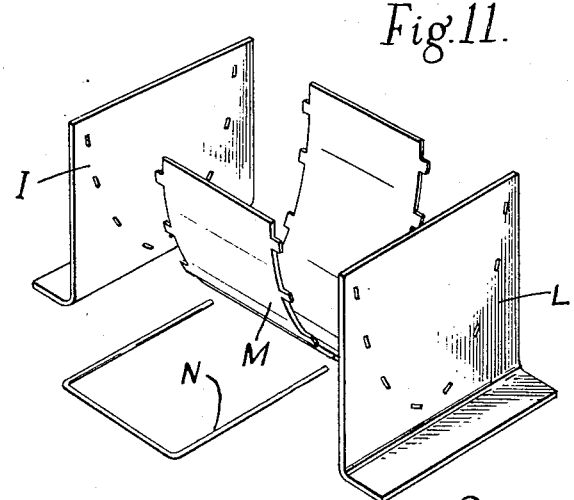
FIGURE 11 is an exploded perspective view of the matrix for models.
Figure 12:
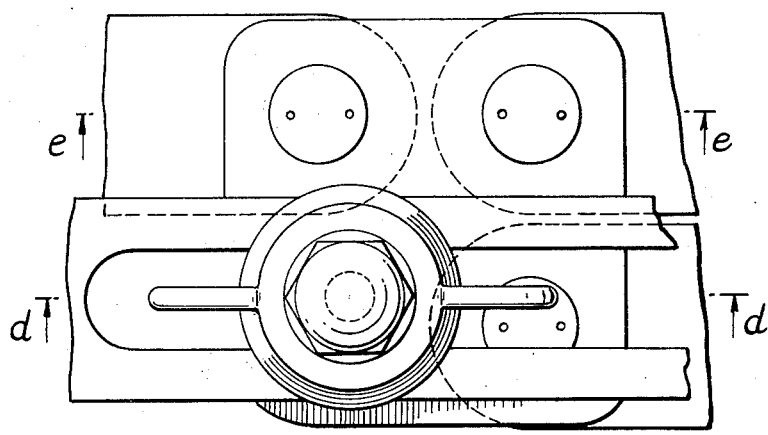
FIGURE 12 is an enlarged side view of one assembly plate of the head-clamp.
Figure 13:
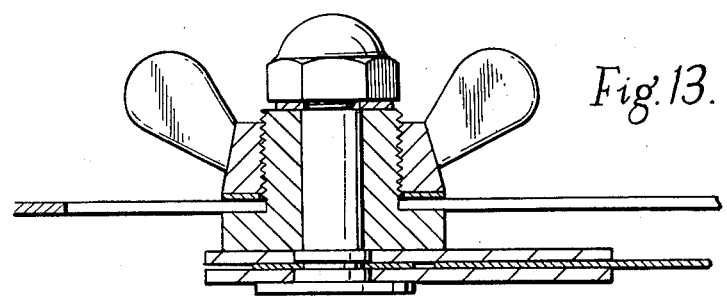
FIGURE 13 is a sectional view of one assembly plate of the head-clamp along the section line d—d of FIGURE 12.
Figure 14:
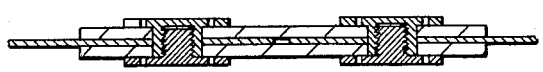
FIGURE 14 is a sectional view of one assembly plate of the head clamp along the section line e—e of FIGURE 12.
Figure 15:
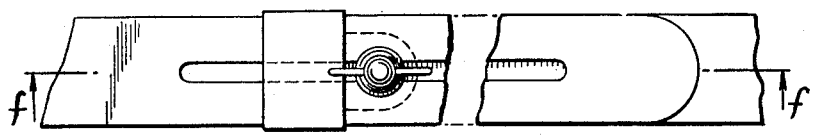
FIGURE 15 is an elevational view of the means for adjustment of one strip of the head-clamp.
Figure 16:
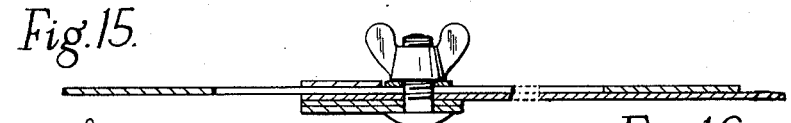
FIGURE 16 is a sectional view of the means for adjustment of one strip of the head-clamp along the section line f—f of FIGURE 15.

*The mould for models.*—This is formed by two cheeks I and L—FIG. 11—having slots following the outline of the screen clamp and coinciding with the projections on the two opposite edges of a curved plate. When assembled, the parts are held together by means of the fork N—FIG. 11. This mould permits making simultaneously two models.

*The perfectly correct occlusion system.*—When taking the articulation impression, frequently the patient bites incorrectly from apprehension. It is to remedy this inconvenience that this system has been conceived. It obliges the patient to bite properly.

Figure 17:
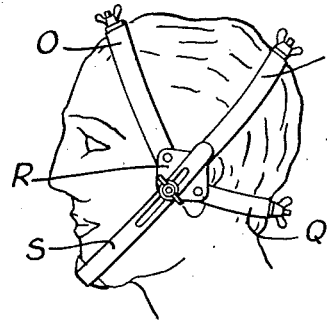
FIGURE 17 is a general view of the head-clamp and chin-piece in position on a patient.

It is composed of a head clamp, made of three metallic strips, each with a length regulator and attached by two spindles to a pair of ear plates and a chin strap S—FIG. 17—adjustable by two wing nuts.

Directions for Use

The patient's head is secured in the head clamp, making sure of a perfect fitting. (The patient must be able to open and close his mouth freely.)

The impression carrier is then prepared, and the separation screen is slid in; the two parts of the screen clamp are brought together and fixed in position with the handle. The wing nut is then tightened.

The capillary tube is then connected to the bag.

The two sides of the separation plate are then coated with alginate impression plaster and the whole is then placed in position in the patient's mouth.

The patient then shuts his mouth tightly. This being done, compressed air is blown in. Under the pressure, the bag fills, stretches and pushes the paste against the roof and in every small interstice.

The paste is allowed to harden, after which the patient's mouth is opened and the practitioner extricates the apparatus.

Once it is out of the mouth, the apparatus is rinsed in clear water to remove all traces of saliva, the handle is released, and the capillary tube removed.

The impression tray is placed in the mould, securing it with a strip of rubber. A fairly liquid plaster paste is poured in and the whole is stood on a vibrator to remove all air bubbles. This done, and once the plaster is hard, the mould is opened by removing the clamp, the two cheeks, and the rubber strip.

The whole assembly thus obtained; impression tray, impressions and models is placed between a metallic jaw apparatus especially designed for this purpose, and hooked into position, to obtain a perfect fitting. The metallic jaws are opened and the impressions are removed from the models. The impression tray is taken out, and the impressions themselves removed. The metallic jaws are then closed.

The models left will then form a perfect replica of the natural and normal patient's jaw.

*Advantages of This Method*

Impressions and models obtained correspond exactly to the real chewing functions.

In one sitting, the lower jaw impression, the upper jaw impression, and the articulation impression are obtained.

The two models can be produced at once and they need not be further shaped.

Reduction in the varieties of impression trays, these being adaptable to all jaws owing to the bag which automatically fits to any roof.

I claim:

1. Means for use in taking dental impressions, comprising a screen clamp including two arcuate plates shaped to correspond respectively to the curvature of the upper and lower rows of teeth and coupled together at each end by pivots, a separation plate disposed between the adjacent edges of the arcuate plates and extending fully across the area embraced by the arcuate plates, clamping means engaged on remote edges of the arcuate plates and serving to urge said plates into gripping engagement on the separation plate, and an expansible bag disposed on the upper face of the separation plate for forcing impression material, placed on said plate, into firm engagement with the roof of the mouth.

2. Means as claimed in claim 1, comprising an arcuate flange of resilient material secured at the underface of the separation plate for retaining impression material against the inner surface of the lower jaw.

3. Means as claimed in claim 1, wherein the clamping means is constituted by a U-shaped handle having a bolt engaged through its arms and receiving a tightening nut thereon, and lips at the free ends of its arms to engage over remote edges of the two arcuate plates.

4. Means as claimed in claim 1, wherein the two arcuate plates have teeth and indentions to provide anchorage in impression material allowed to set in contact therewith.

5. Means as claimed in claim 1, wherein the separation plate has a U-shaped row of apertures, the expansible bag on its upper face and an arcuate flange at its underface being made of rubber and being integral with rubber neck portions positioned in said apertures, the expansible bag having a mouth to which is integrally secured a rubber tube serving for passage of air when inflating and deflating the expansible bag.

References Cited in the file of this patent

UNITED STATES PATENTS

| | | |
|---|---|---|
| 1,023,213 | Marcks | Apr. 16, 1912 |
| 1,093,125 | Guilford | Apr. 14, 1914 |
| 1,377,075 | Homer | May 3, 1921 |
| 2,311,158 | Conway et al. | Feb. 16, 1943 |
| 2,583,170 | Getz | Jan. 22, 1952 |